United States Patent [19]

Kuan et al.

[11] Patent Number: 5,894,561
[45] Date of Patent: Apr. 13, 1999

[54] ADAPTING APPARATUS USED IN A COMPUTER ISA EXTENSION SLOT

[75] Inventors: Chung-Yao Kuan; Hung-Min Wang, both of Hsinchu, Taiwan

[73] Assignee: Winbond Electronics Corp., Hsinchu, Taiwan

[21] Appl. No.: 08/814,906

[22] Filed: Mar. 12, 1997

[51] Int. Cl.$^6$ ............................................. G06F 13/00
[52] U.S. Cl. ............................................. 395/283
[58] Field of Search ............................ 395/281, 282, 395/283, 308, 309

[56] References Cited

U.S. PATENT DOCUMENTS 5,473,499  12/1995  Weir ................................. 395/283
5,586,271  12/1996  Parrett .............................. 395/283
5,671,368   9/1997  Chan et al. ....................... 395/282
5,754,796   5/1998  Wang et al. ...................... 395/281

*Primary Examiner*—Glenn A. Auve
*Attorney, Agent, or Firm*—Bacon & Thomas PLLC

[57] ABSTRACT

An adapting apparatus used in a computer ISA extension slot allows add-on-cards to be inserted into or pulled off without the need of turning off the power. The adapting apparatus includes an ISA terminal for connection to the ISA slot, an extension ISA slot for receiving an add-on-card, a signal-line switch for controlling connection/disconnection of a plurality of signal lines between the computer ISA extension slot and the add-on-card, a power-line switch for controlling connection/disconnection of a plurality of power lines between the ISA extension slot and the add-on-card, an overload protection device, and a control circuit for controlling the signal-line switch and the power-line switch.

9 Claims, 5 Drawing Sheets

| STATUS | CNTR0 | CNTR1 | ARESET |
|---|---|---|---|
| POWER-ON | 0 | 0 | 0 |
| CONNECTION SEQUENCE | 1 | 0 | 0 |
|  | 1 | 1 | 1 |
|  | 1 | 1 | 0 |
| ISOLATION SEQUENCE | 0 | 1 | 0 |
|  | 0 | 0 | 0 |

5,894,561

ADAPTING APPARATUS USED IN A COMPUTER ISA EXTENSION SLOT

BACKGROUND OF THE INVENTION

1. Field of the Invention

The present invention relates to an adapting apparatus used in a computer ISA extension slot, particularly one which allows add-on-cards to be inserted into or pulled off without the need of turning off power.

2. Description of the Prior Art

ISA extension slots are formed in a computer main board for receiving cards such as a VGA card, network card, I/O interface card, or other add-on-cards. Normally, the power source has to be turned off before changing (pulling out/ inserting in) the add-on-card preventing from damage to the add-on-card. However, this causes inconvenience and takes time if there are a plurality of add-on-cards to be tested by the same computer main board. Moreover, too frequent turning on/off a computer will potentially shorten the available life of the computer.

It is requisite to provide a new device which can eliminate the requirement of the turning on/off of a computer when an add-on-card is pulled off or inserted in the computer main board.

SUMMARY OF THE INVENTION

The primary objective of the present invention is to provide an adapting apparatus used in a computer ISA extension slot allowing add-on-cards to be pulled off and inserted in without the need of power-off.

Another objective of the present invention is to provide an adapting apparatus used in a computer ISA extension slot for protecting the power source upon overload of the computer.

In accordance with one aspect of this invention, there is provided an adapting apparatus for electrically connecting/ disconnecting an add-on-card to/from a computer ISA extension slot. The adapting apparatus comprises: an ISA terminal for connection to the computer ISA extension slot; an extension ISA slot for receiving the add-on-card; a signal-line switch for controlling connection/disconnection of a plurality of signal lines between the computer ISA extension slot and the add-on-card; a power-line switch for controlling connection/disconnection of a plurality of power lines between the computer ISA extension slot and the add-on-card; and a control circuit for controlling on/off of the signal-line switch and the power-line switch.

Further objectives and advantages of the present invention will become apparent from a careful reading of the detailed description provided hereinbelow, with appropriate reference to the accompanying drawings.

DETAILED DESCRIPTION OF THE PREFERRED EMBODIMENT

Figure 1:
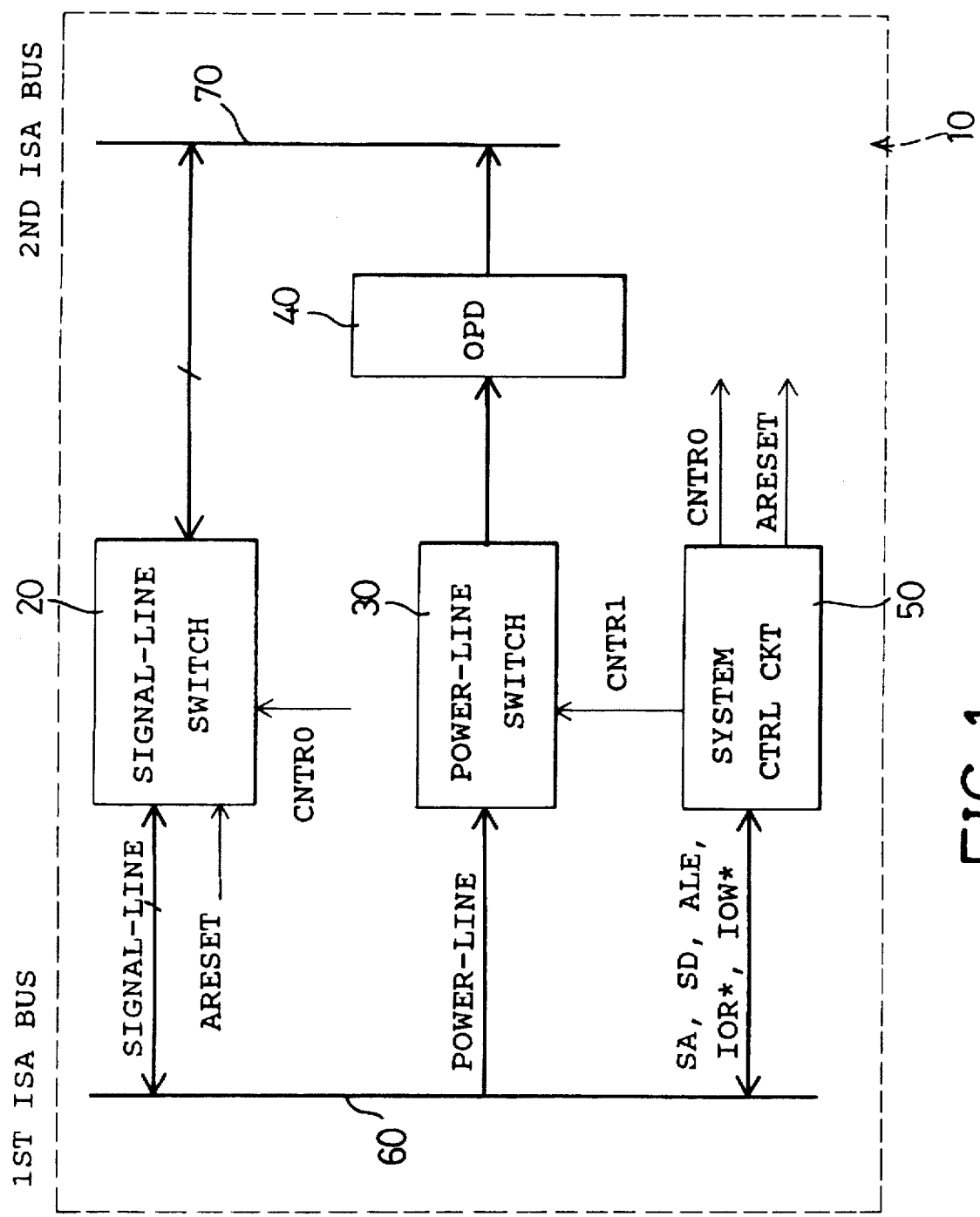
FIG. 1 is a block circuit diagram of an adapting apparatus in accordance with the present invention.

Referring to FIG. 1, an adapting apparatus 10 in accordance with the present invention comprises a first ISA bus 60 for electrically connecting to an ISA extension slot of a computer, a second ISA bus 70 for electrically connecting to an add-on-card via an extension slot (not shown). In other words, the adapting apparatus 10 functions as an interface between the ISA extension slot of a computer and an add-on-card.

The adapting apparatus 10 further comprises a signal-line switch 20 connected between the first ISA bus 60 and the second ISA bus 70 for switching on/off between two sets of signal lines respectively originated from the first ISA bus 60 and the second ISA bus 70.

A power-line switch 30 and an overload protection device 40 are serially connected between the first ISA bus 60 and the second ISA bus 70 for switching on/off between two sets of power lines respectively originated from the first ISA bus 60 and the second ISA bus 70. The overload protection device 40 includes a plurality of independent portions functioning as conductive lines when rated currents flows therethrough, and it functions as an open-circuit when an overload current flows therethrough.

A system control circuit 50 is electrically connected to the first ISA bus 60, the signal-line switch 20, and the power-line switch 30 for controlling the operation of the signal-line switch 20 and the power-line switch 30.

Figure 2:
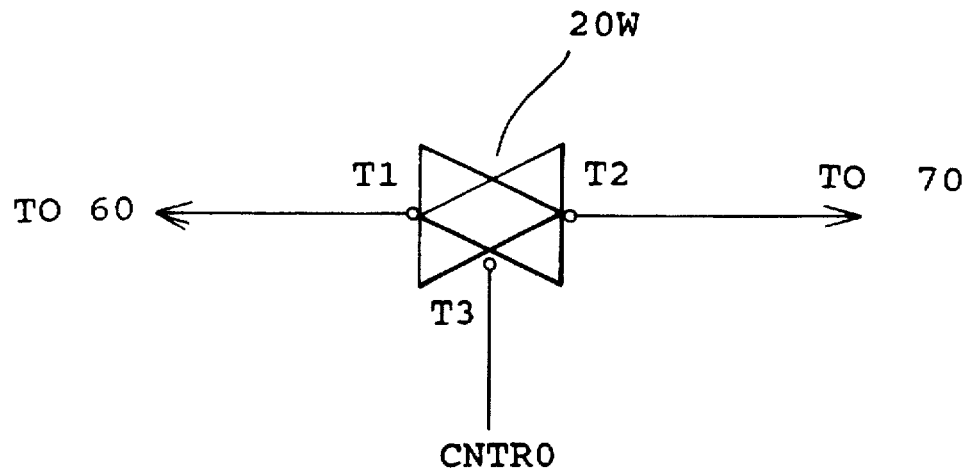
FIG. 2 is one of the options for the signal-line switch used in the circuit of FIG. 1.

The signal-line switch 20 may be constituted by a plurality of analog switches one of which is shown in FIG. 2. Each of the analog switches 20 has a first terminal T1 connected to the first ISA bus 60, a second terminal T2 connected to the second ISA bus 70, and a control terminal T3. All the analog switches 20 are connected together by their control terminals T3. The control terminal T3 of the analog switch 20 receives a control signal CNTR0 from the system control circuit 50, which is either in an actuating level or in a deactuating level. The first terminal and the second terminal are electrically connected when the control signal CNTR0 received by the control terminal T3 is in an actuating level (e.g., logical high status), otherwise they are electrically disconnected when the control signal is in a deactuating level (e.g., logical low status). These analog switches 20 may be replaced with other types of switches such as mechanical-type relays or solid state relays.

Figure 3:
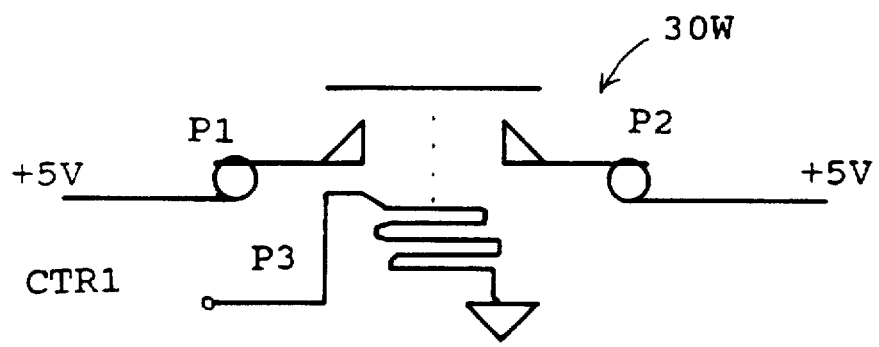
FIG. 3 is one of the options for the power-line switch used in the circuit of FIG. 1.
Figure 4:
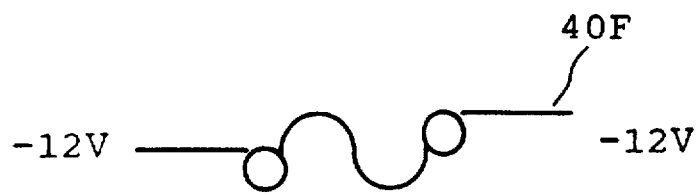
FIG. 4 illustrates one of the options for the overload protection device of FIG. 1.

Similar to the signal-line switch 20, the power-line switch 30 is consisting of a plurality of relays 30 W one of which is shown in FIG. 3. Each of the relays 30 W controls transmission of a specific power (voltage), such as 0V, +5V, −5V, +12V, or −12V, between the first bus 60 and the second bus 70. Each of the relay 30 W has a first terminal P1 connected to the first ISA bus 60, a second terminal P2 connected to the second ISA bus 70, and a control terminal P3. All the relays 30 W are connected together by their control terminals P3. The control terminal P3 of the relay 30 W receives a control signal CNTR1 from the system control circuit 50, which is either in an actuating level (e.g., a logical high level) or in a deactuating level (e.g., a logical low level). The first terminal P1 and the second terminal P2 are electrically connected so as to transmit a specific power (voltage), for example +5V, between the first bus 60 and the second bus 70 when the control signal CNTR1 is in an actuating level, otherwise they are electrically disconnected to cut off transmission of the specific power (e.g., +5V) between the first bus 60 and the second bus 70. These relays 30 W may be mechanical-type relays or solid state relays.

The overload protection device 40 are a plurality of fuses 40 F each of which is connected between one of the relays 30 W and a corresponding one power line (not shown) of the second bus 70. Each of the fuses 40 F may be a common fuse or a recoverable overcurrent switch.

Figure 5:
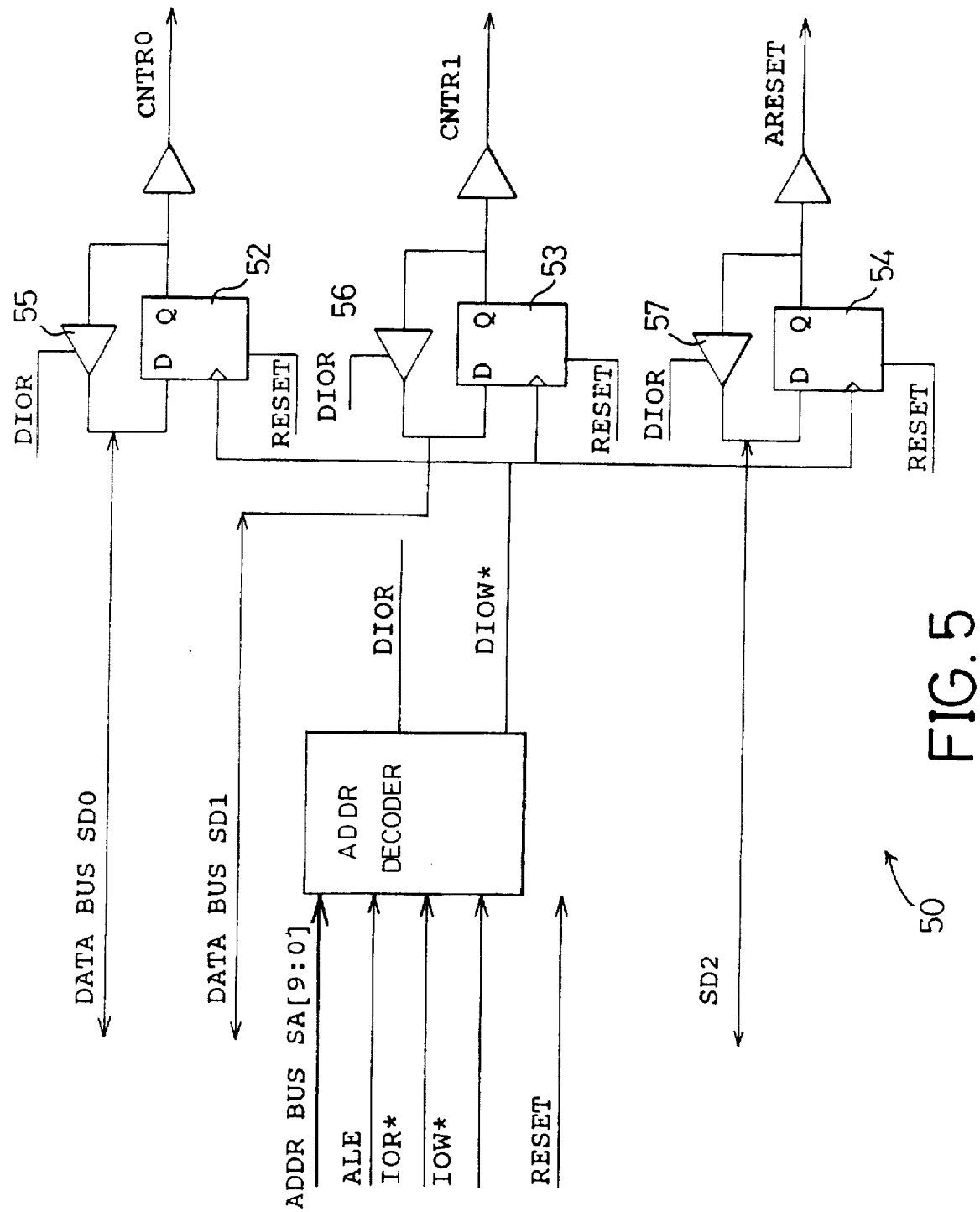
FIG. 5 illustrates the system control circuit diagram of FIG. 1.

The system control circuit 50 can further stimulatingly generates a reset signal for the add-on-card in addition to the signals CNTR0 and CNTR1. FIG. 5 is a circuit diagram of the system control circuit 50 which includes an address decoder 51 and a first latch 52, a second latch 53, and a third latch 54. The latches 52, 53, and 54 are D-type flip flops and respectively receive data from data buses SD0, SD1, and SD2. The address decoder 51 comprises a plurality of input terminals respectively receiving address data from the address bus SA, the address enable signal ALE, and the read/write signals IOW* and IOR*. Data inputted to the address decoder 51 are converted into a read-triggering signal DIOR and a write-triggering signal DIOW*. The write-triggering signal DIOW* is used to trigger the latches 52, 53, and 54 to receive and latch data which respectively come from the data buses SD0, SD1, and SD2. A first tristate buffer 55 is connected between an output terminal Q and an input terminal D of the first latch 55. Similarly, a second tristate buffer 56 and a third tristate buffer 57 are respectively connected to the second latch 56 and the third latch 57. The read-triggering signal DIOR is coupled to each control terminal (no label) of the tristate buffers 55, 56, and 57 and control the "on" or "off" of the buffers. The data buses SD0, SD1, and SD2 are respectively connected to a corresponding input terminal D of the latches 52, 53, and 54. The output terminals Qs of the latches 52, 53, and 54 respectively output the control signals CRTR0, CRTR1, and the reset signal ARESET.

Figure 6:
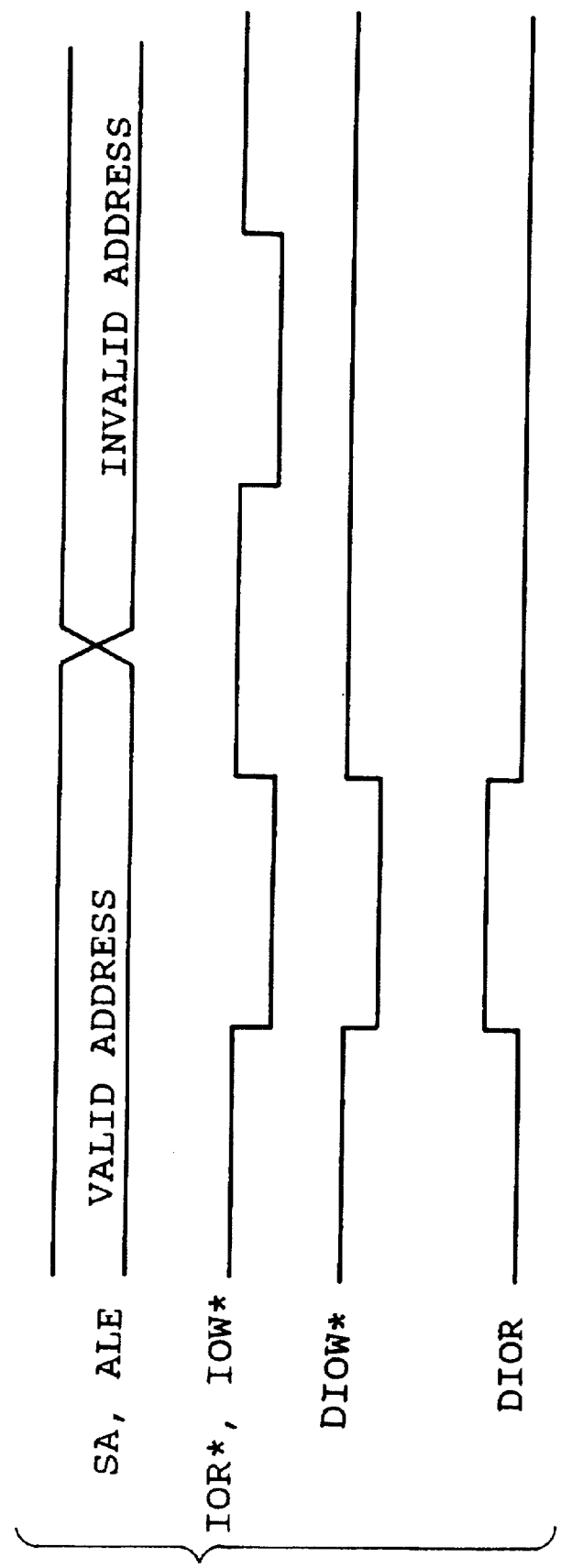
FIG. 6 illustrates timing charts of an address decoder of the system control circuit of FIG. 5.

The address decoder 51 of the system control circuit 50 operates according to an input/output timing relation as shown in FIG. 6. Referring to FIGS. 5 and 6, the three latches 52, 53, and 54 are triggered by a rising edge of the write-triggering signal DIOW* to latch the data coming from the data buses SD0, SD1, and SD2. The tristate buffers 55, 56, and 57 transmit the output data from the latches 52, 53, and 54 to the computer main board via the data buses SD0, SD1, and SD2. The tristate buffers 55, 56, 57 are actuated to be "on" thus transmitting data from the latches 52, 53, 54 to the computer main board via the data buses SD0, SD1, and SD2 when the read-triggering signal DIOR is on a high level. Simultaneously, the system control circuit is connected to and controlled by the computer main board.

Figures 7, 8:
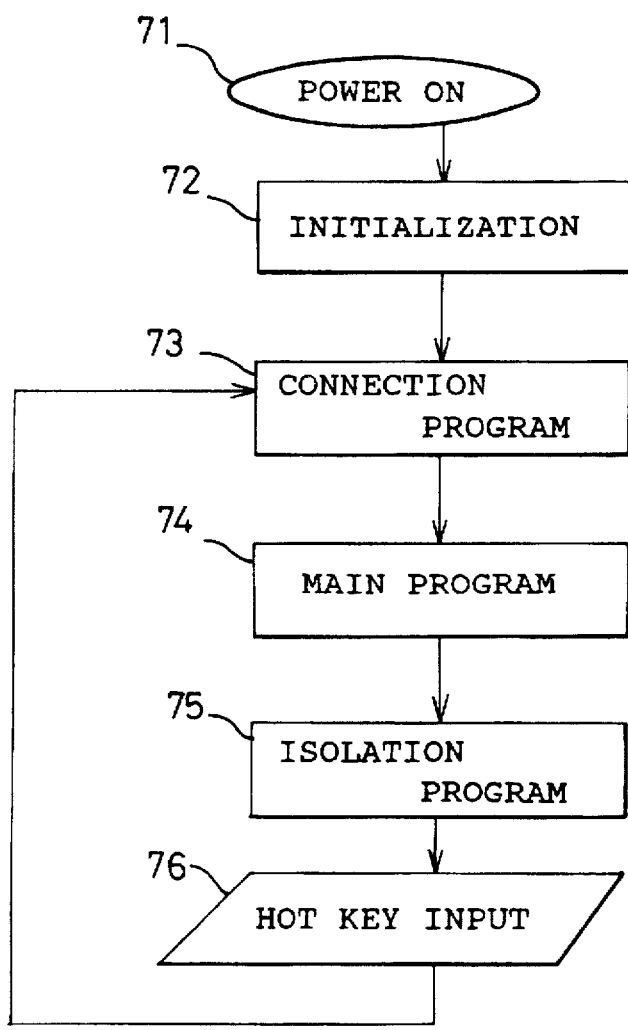
FIG. 7 is a software flowchart cooperating with the system control circuit of FIG. 5.
FIG. 8 is a table illustrating relative relation between control signals used in the present invention.

FIG. 7 illustrates a control flow chart applied on the add-on-card. Initially, the power is turned on and the initialization is set respectively at step 71, and step 72. At step 73, the add-on-card is electrically connected to the computer main board by providing signals from the computer main board to the system control circuit 50 thus turning on the switches 20 and 30. At step 74, the add-on-card is under test by control of a main program performed in the computer main board. After the main program is executed, a step of insolation 75 is executed to electrically disconnect the add-on-card from the computer main board by turning off the switches 20 and 30. The add-on-card may be manually pulled out during this isolation period without damaging the computer main board. Simultaneously, another add-on-card may be inserted into the extension slot of the computer main board without the need of power off. The steps of 73, 74, and 75 are repeated upon depression on a "hot key" which is predetermined to actuate steps 73, 74, and 75.

During the connection and isolation periods (i.e., from steps 73 to 75), the control signals CNTR0, CNTR1 for controlling on/off of the signal-line switch 20 and the power-line switch 30 and the reset signal ARESET must have a predetermined relation for avoiding problems caused by surging current or overcurrent due to simultaneous connection/disconnection of the power lines and the signal lines between the add-on-card and the computer main board. This predetermined relation between the control signals CNTR0, CNTR1 and the reset signal ARESET is shown in FIG. 8. When power is initially turned on, the three signals CNTR0, CNTR1, and ARESET are all set to "0", i.e., the adapting apparatus is not actuated. When the system is operated during the connection step 73, firstly, the control signal CNTR0 is set to "1" for turning on the signal-line switch 20, and then the control signal CNTR1 is set to "1" for turning on the power-line switch 30. For avoiding overcurrent problem, a time interval at least 0.75 microsecond should exist between the "turning on" operations of the two switches 20 and 30 when the CPU of the computer main board is operated in a standard clock of 8 MHz. The reset signal ARESET is simultaneously set to "1" when the signal CNTR1 is set to "1". The reset signal ARESET is changed to "0" after a predetermined time period allowing the add-on-card to function normally after being reset.

During the isolation period, firstly, the logical status of the control signal CNTR0 is changed from "1" to "0", and then the control signal CNTR1 is changed from "1" to "0", i.e., the power-line switch 30 is turned off after a delay from the "turning off" of the signal-line switch 20.

From the above discussion, it is appreciated that with the adapting apparatus of the present invention, an add-on-card can be pulled out or inserted into an extension slot of the adapting apparatus without the need of turning off the power. This advantage can reduce the frequency of switching on/off of the computer, thus eliminating a damage to the computer due to surge current. Meanwhile, the present invention eliminates the need of restarting and rebooting the computer, thus simplifying add-on-card testing procedure. Accordingly, this advantage can eliminate overcurrent problems due to frequent pull-out or insertion of add-on-cards. Therefore, the present invention can provide convenience and safety during long term of add-on-card test.

While the present invention has been explained in relation to its preferred embodiment, it is to be understood that various modifications thereof will be apparent to those skilled in the art upon reading this specification. Therefore, it is to be understood that the invention disclosed herein is intended to cover all such modifications as fall within the scope of the appended claims.

I claim:

1. An adapting apparatus for electrically connecting/ disconnecting an add-on-card to/from a computer ISA extension slot, comprising:

an ISA terminal for connection to the computer ISA extension slot;

an extension ISA slot for receiving the add-on-card;

a signal-line switch for controlling connection/ disconnection of a plurality of signal lines between the computer ISA extension slot and the add-on-card;

a power-line switch for controlling connection/ disconnection of a plurality of power lines between the computer ISA extension slot and the add-on-card; and a system control circuit having an address decoder and a plurality of latches connected to the address decoder for controlling on/off of the signal-line switch and the power-line switch.

2. An adapting apparatus as claimed in claim 1 further comprising an overload protection device connected in series with the power-line switch for automatically cutting off the connection between the power lines between the computer ISA extension slot and the add-on-card upon overcurrent.

3. An adapting apparatus as claimed in claim 2, wherein the overload protection device is a fuse.

4. An adapting apparatus as claimed in claim 2, wherein the overload protection device is a current-type switch.

5. An adapting apparatus as claimed in claim 1, wherein the signal-line switch is a relay.

6. An adapting apparatus as claimed in claim 1, wherein the power-line switch is a relay.

7. An adapting apparatus as claimed in claim 1, wherein the signal-line switch and the power-line switch have an operation sequence controlled by the system control circuit, said sequence being one of any sequential combination of said switches.

8. An adapting apparatus as claimed in claim 1, wherein the system control circuit has an output terminal for outputting a reset signal to reset a new inserted add-on-card.

9. An adapting apparatus as claimed in claim 8, wherein the reset signal is outputted from the system control circuit when the power-line switch is turned on.

* * * * *